United States Patent
Machavolu et al.

(10) Patent No.: US 11,852,544 B2
(45) Date of Patent: Dec. 26, 2023

(54) TEMPERATURE SENSOR FOR NON-VOLATILE MEMORY

(71) Applicant: Infineon Technologies LLC, San Jose, CA (US)

(72) Inventors: Srikanth Machavolu, Colorado Springs, CO (US); Sheshadri Sohani, Kodigehalli (IN); Kapil Jain, Colorado springs, CO (US); Alan D. DeVilbiss, Colorado Springs, CO (US)

(73) Assignee: Infineon Technologies LLC, San Jose, CA (US)

( * ) Notice: Subject to any disclaimer, the term of this patent is extended or adjusted under 35 U.S.C. 154(b) by 316 days.

(21) Appl. No.: 17/219,160

(22) Filed: Mar. 31, 2021

(65) Prior Publication Data

US 2022/0268638 A1     Aug. 25, 2022

Related U.S. Application Data (60) Provisional application No. 63/153,412, filed on Feb. 25, 2021.

(51) Int. Cl.
  *G01K 7/16* (2006.01)
  *G01K 7/01* (2006.01)

(52) U.S. Cl.
  CPC .................. *G01K 7/16* (2013.01); *G01K 7/01* (2013.01)

(58) Field of Classification Search
  CPC .................. G01K 7/16; G01K 7/01
  USPC .......................................................... 374/178
  See application file for complete search history.

(56) References Cited

U.S. PATENT DOCUMENTS

| | | | | |
|---|---|---|---|---|
| 7,088,172 B1* | 8/2006 | Lesea | ....................... | G05F 3/205 327/543 |
| 7,632,011 B1* | 12/2009 | Lall | ........................ | G01K 7/01 374/103 |
| 7,643,889 B2* | 1/2010 | Jeong | ....................... | G01K 7/01 326/82 |
| 2005/0146965 A1* | 7/2005 | Kim | ..................... | G11C 7/1051 326/32 |
| 2008/0059110 A1* | 3/2008 | Fujisawa | ................ | G01K 7/015 374/E7.036 |
| 2013/0169347 A1* | 7/2013 | Kim | ........................ | G06F 1/206 327/513 |
| 2015/0003490 A1* | 1/2015 | Ash | ....................... | G01K 15/005 374/1 |
| 2021/0325261 A1* | 10/2021 | Hu | ......................... | H10B 43/40 |

* cited by examiner

*Primary Examiner* — Natalie Huls (57) ABSTRACT

Embodiments of the present disclosure provide a temperature sensor that may be integrated into a memory device along with a 1T1C reference voltage generator to enable the 1T1C reference voltage generator to provide a temperature dependent 1T1C reference voltage to a memory core (e.g., F-RAM memory core) of the memory device. The temperature sensor may detect a temperature of the memory core, and output this information (e.g., as a trim) for use by the 1T1C reference voltage generator in providing a temperature dependent 1T1C reference voltage. In this way, both the P-term and U-term margins of the memory core may be maintained even as a temperature of the memory core increases.

20 Claims, 10 Drawing Sheets

TEMPERATURE SENSOR FOR NON-VOLATILE MEMORY

RELATED APPLICATIONS

This application claims priority to U.S. Provisional Patent Application No. 63/153,412, filed on Feb. 25, 2021, the disclosure of which is hereby incorporated herein in its entirety.

TECHNICAL FIELD

The present disclosure relates generally to non-volatile (NV) memory devices, and more particularly, to temperature sensors for enabling temperature dependent single-ended sensing, such as one transistor one capacitor (hereinafter "1T1C") reference voltage generation for a ferroelectric random-access memory (F-RAM) device.

BACKGROUND

Memory that retains its data even when operation power is not available is classified as NV memory. Examples of NV memory are non-volatile SRAM (nvSRAM), F-RAM, electrically erasable programmable read-only memory (EEPROM), and flash memories. This class of memory may be used in applications in which critical data must be stored after power is removed, or when power is interrupted during operation.

In some embodiments, such as in F-RAM devices, 1T1C refers to a memory cell architecture utilizing single ended sensing as opposed to differential sensing used by 2T2C. More specifically, the sense operation of a sense amplifier in a 1T1C architecture compares an amplitude of a memory signal outputted from the first memory cell to a reference signal. The 1T1C F-RAM architecture is advantageous because of the smaller cell size as compared with two transistor two capacitor (2T2C) F-RAM architectures. Non-switching term (U-term) is the charge generated on an F-RAM ferroelectric capacitor when there is no switching of polarization involved after a voltage or electric field is applied thereon. Switching term (P-term) is the charge generated when there is a switching of polarization. In a 1T1C configuration, U-term may represent data "0" and P-term may represent data "1," or vice versa in some embodiments.

For 1T1C F-RAM, a reference voltage is needed to distinguish between switching (P) and non-switching (U) terms in order to distinguish a data "0" from a data "1." A temperature independent 1T1C reference voltage may be generated from a programmable metal-oxide semiconductor (MOS) capacitance array, for example. The 1T1C reference voltage must be programmed in such a way that the reference is higher than the maximal U-term and lower than the minimal P-term in order to properly distinguish between data "0" from a data "1."

BRIEF DESCRIPTION OF THE DRAWINGS

The present embodiments are illustrated by way of example, and not of limitation, in the figures of the accompanying drawings.

DETAILED DESCRIPTION

In the following description, for purposes of explanation, numerous specific details are set forth in order to provide a thorough understanding of the present embodiments. It will be evident, however, to one skilled in the art that the present embodiments may be practiced without these specific details. In other instances, well-known circuits, structures, and techniques are not shown in detail, but rather in a block diagram in order to avoid unnecessarily obscuring an understanding of this description.

Reference in the description to "one embodiment" or "an embodiment" means that a particular feature, structure, or characteristic described in connection with the embodiment is included in at least one embodiment. The phrase "in one embodiment" located in various places in this description does not necessarily refer to the same embodiment.

A temperature independent sensing or read reference voltage is fixed and determined based on P-term and/or U-term at a particular temperature or temperature range, but does not change with temperature. For example, the 1T1C reference voltage may be set at 21 mV above the room temperature U-term. However, as the temperature of the F-RAM memory core increases, the P-term memory margin may gradually lower, resulting in both the P-term and U-term margins being inconsistent across temperature shifts (see FIG. 3). In other NVM devices, the sensing reference voltage may be fixed according to other characteristics of the NVM cells, such as drain current, threshold voltage of Flash memory.

Existing 2T2C solutions that adopt differential sensing may not require a sensing reference voltage, while other alternative solutions involve limiting the 1T1C cell usage until an industrial temperature (e.g., 85 degrees Celsius (C)) is reached, and tuning the 1T1C voltage reference for all 1T1C macros. However, 2T2C solutions are not area efficient and thus decrease the memory density, often by half. Other previous implementations have been proposed that utilize conventional silicon-based temperature sensor designs based on bandgap-type circuits for the temperature sensor. However, these approaches involve a high level of design complexity, slow startup time, high standby current, and require a large layout area.

Embodiments of the present disclosure provide systems and devices (temperature sensor) that can adjust a 1T1C reference voltage to account for the temperature behavior of an F-RAM memory. Although described with respect to F-RAM memory and 1T1C architecture for illustrative purposes, embodiments of the present disclosure are not limited in this way and may be applied to memory devices having memory cores based on any suitable type of NV memory and any suitable architecture.

In one embodiment, a temperature sensor is provided that comprises a resistor circuit including nwell and silicide-blocked polysilicon resistors. The nwell resistors have a significant positive temperature coefficient. The polysilicon resistors have a small temperature coefficient that is close to zero by comparison. A reference voltage of the temperature sensor may increase as the temperature of a memory core increases while an input voltage of the temperature sensor will decrease with increasing memory core temperature. The temperature sensor further comprises a resistor stack with 8 tap points such that the voltage at each tap point is lower than the tap point above as current flows through the stack Each tap point is connected to a respective comparator. Given appropriate ratios among resistors in the resistor circuit, the comparator outputs will transition at specific temperatures, defining nine distinct temperature zones. These outputs are used to adjust a 1T1C reference voltage provided to the memory core, in order to compensate for increasing temperature of the memory core, based on the indicated temperature zone.

Figure 1:
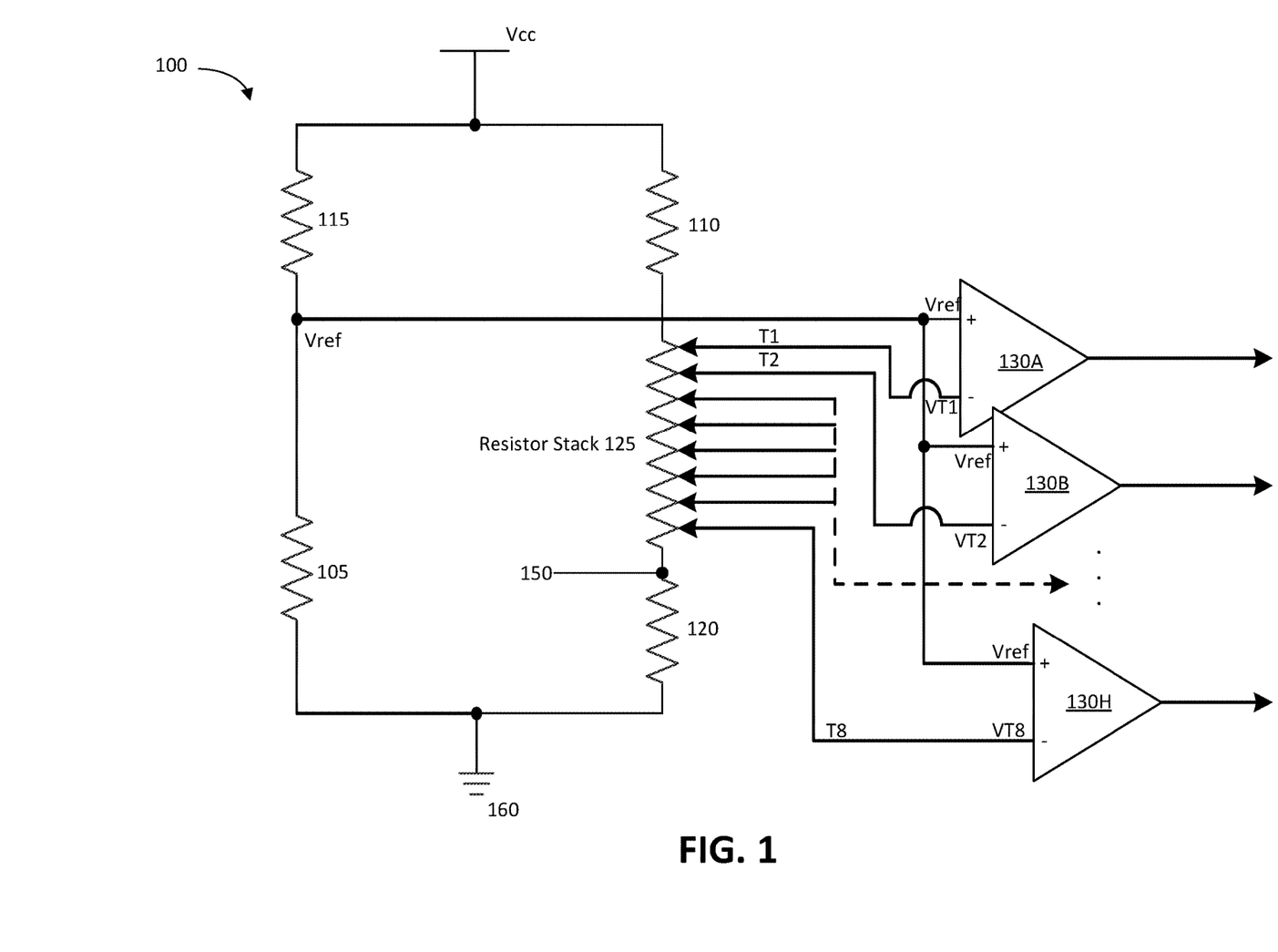
FIG. 1 is a diagram illustrating a temperature sensor, according to some embodiments of the present disclosure.
Figure 7A:
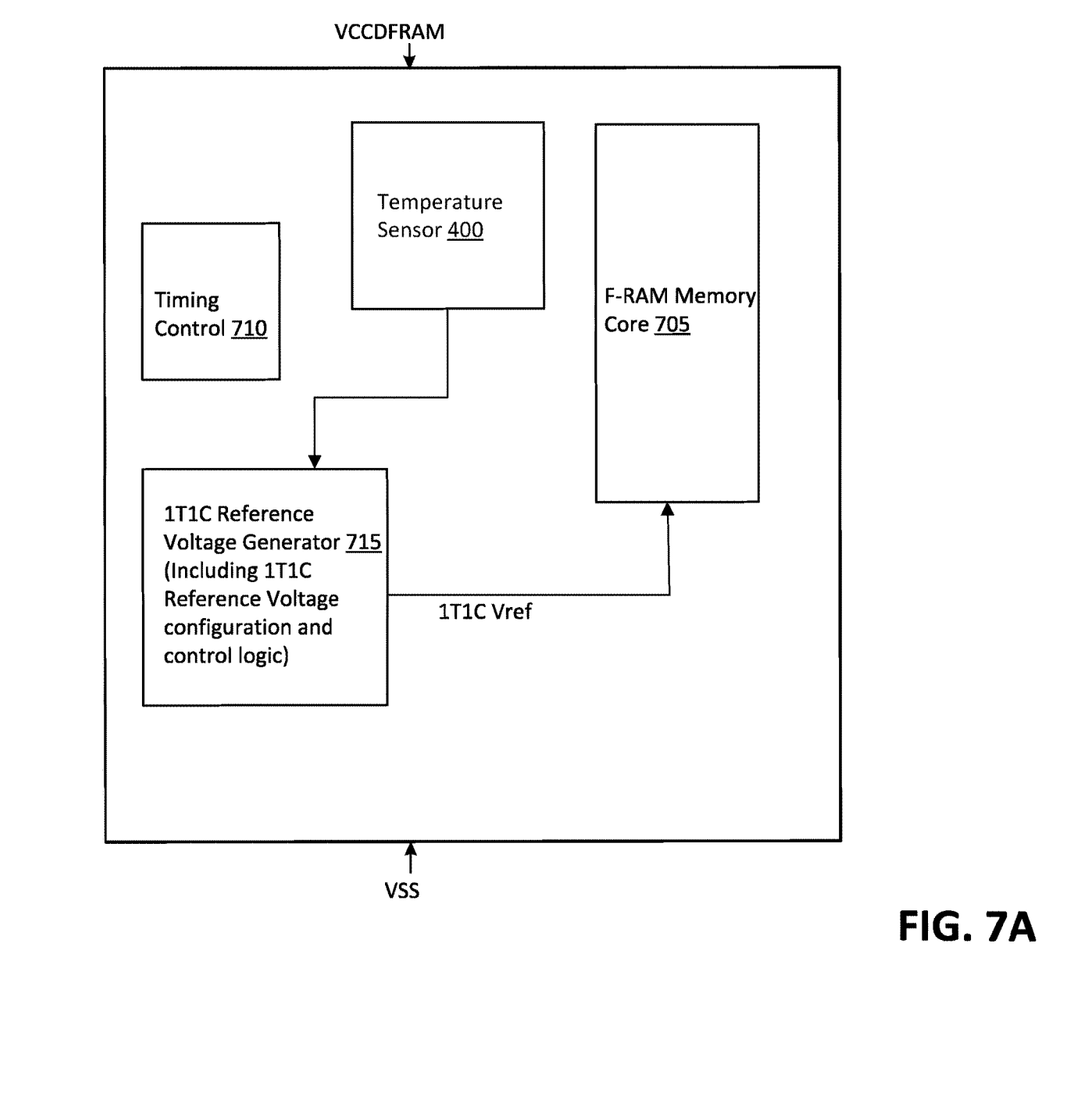
FIG. 7A illustrates a memory device in which embodiments of the present disclosure may be realized.

FIG. 1 is a diagram illustrating a temperature sensor 100 (hereinafter referred to as "sensor 100") for sensing the temperature of a memory core (e.g., F-RAM memory core 705 as shown in FIG. 7). The sensor 100 may be integrated with a 1T1C reference voltage generator (e.g., F-RAM 1T1C reference voltage generator 715 as shown in FIG. 7) so as to provide a temperature dependent 1T1C reference voltage (hereinafter referred to as 1T1C Vref) to the memory core according to the sensed temperature of the memory core. In one embodiment, sensor 100 may be disposed physically adjacent to the memory core such that sensor 100 and the memory core are exposed to an approximately same range of temperatures. The sensor 100 may comprise resistors 105 and 110, and resistors 115 and 120 (resistors 105-120 together may form a resistor circuit such as a resistor ladder). Resistors 105 and 110 may be Nwell resistors or other resistive devices known in the art that have a large positive temperature coefficient (i.e., the resistance value of resistors 105 and 110 may change significantly as the temperature of the memory core changes). By contrast, resistors 115 and 120 may be silicide-blocked polysilicon resistors or other resistive devices that have a small temperature coefficient that is close to zero relative to the temperature coefficient of the resistors 105 and 110. Stated differently, the resistance value of resistors 115 and 120 may not change significantly as the temperature of the memory core changes. Resistors 105-120 may be coupled together as shown in FIG. 1 such that as the temperature of the memory core increases, the resistance of resistor 105 may also increase, thereby resulting in an increase in the reference voltage of sensor 100 (Vref). At the same time, the increase in temperature of the memory core may cause the resistance of resistor 110 to increase while the resistance of resistor 120 remains unchanged, thereby resulting in a decrease in the voltage at node 150. This configuration of resistors having differing temperature coefficients, such as among the resistors 105-120 may cause the Vref to increase as the temperature of the memory core increases. It should be noted that the Vref refers to a reference voltage of the sensor 100, and is to be distinguished from the sensing/reading or 1T1C Vref generated by e.g., F-RAM 1T1C reference voltage generator 715 as shown in FIG. 7.

Figure 3:
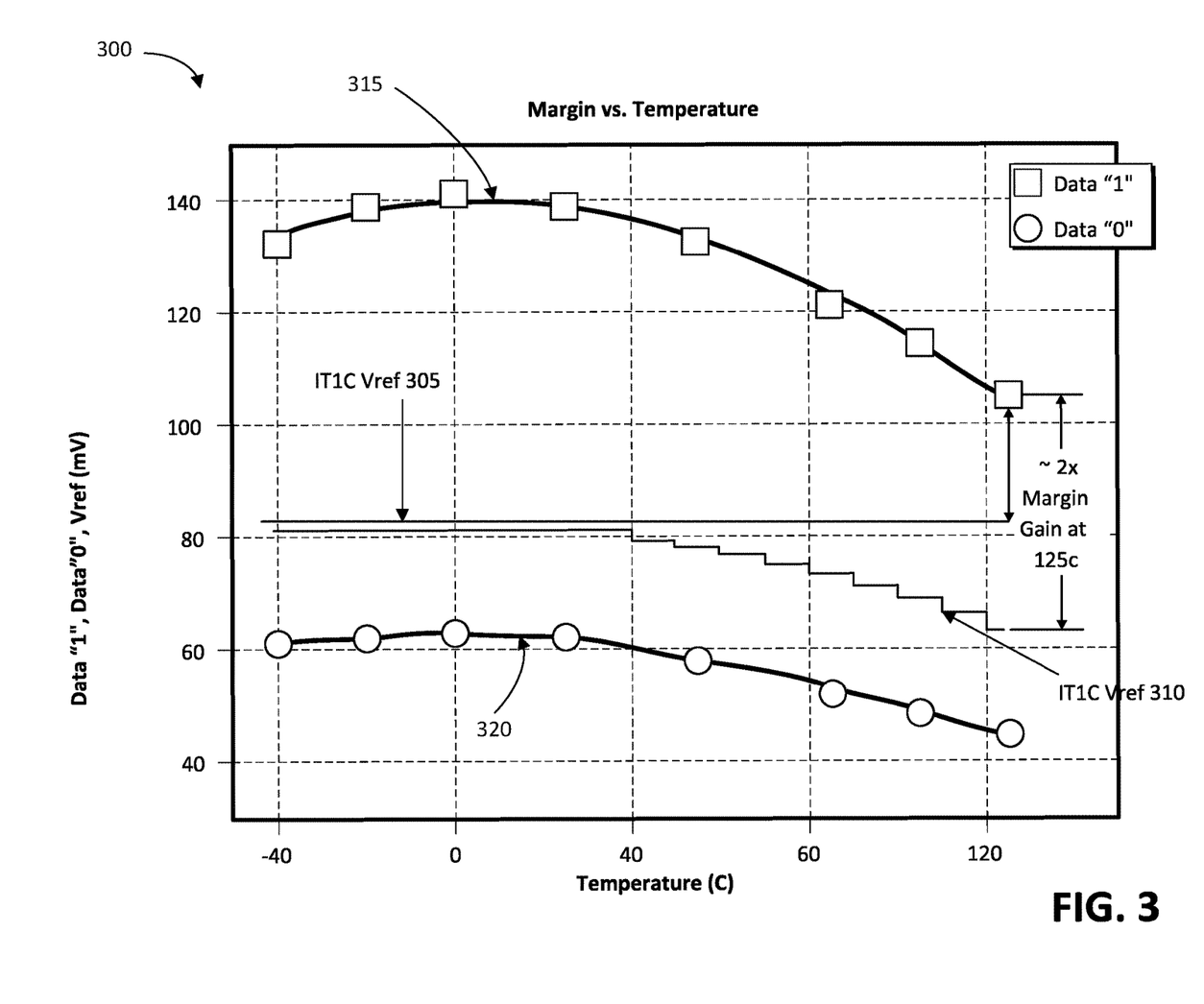
FIG. 3 is a graph of the P-term and U-term margins in a memory core when utilizing a temperature independent 1T1C reference voltage and a temperature dependent 1T1C reference voltage generated using embodiments of the present disclosure.

Sensor 100 may further comprise a resistor stack 125, located or coupled between resistor 110 and resistor 120. The resistor stack 125 may also be a Nwell resistor and may comprise multiple tap points T1-T8, and the voltage at each tap point T1-T8 (VT1-VT8) may be lower than the voltage at the tap points above it as current flows through the resistor stack 125 (e.g., VT2 is lower than VT1) towards ground 160. Although illustrated with 8 tap points, the resistor stack 125 may include any appropriate number of tap points as discussed in further detail herein. Each tap point T1-T8 (also referred to herein as resistor division points) is connected to a corresponding comparator 130A-130H, which may compare the voltage of the corresponding tap point with the Vref. As discussed above, as the temperature of the memory core increases, Vref may increase and the voltage at node 150 may decrease based on the ratios of resistance values among the resistors 105-115. As a result, as the temperature of the memory core increases, the VT at each tap point T1-T8 may decrease such that, over time, as the VT for each successive comparator 130A-130H decreases below the Vref, the output of that comparator will transition (e.g., from "0" to "1" or "low" to "high") at a specific temperature, as shown in FIG. 3. In this way, the outputs of the comparators 130A-130H may define nine distinct temperature zones as discussed in further detail herein.

Figure 2:
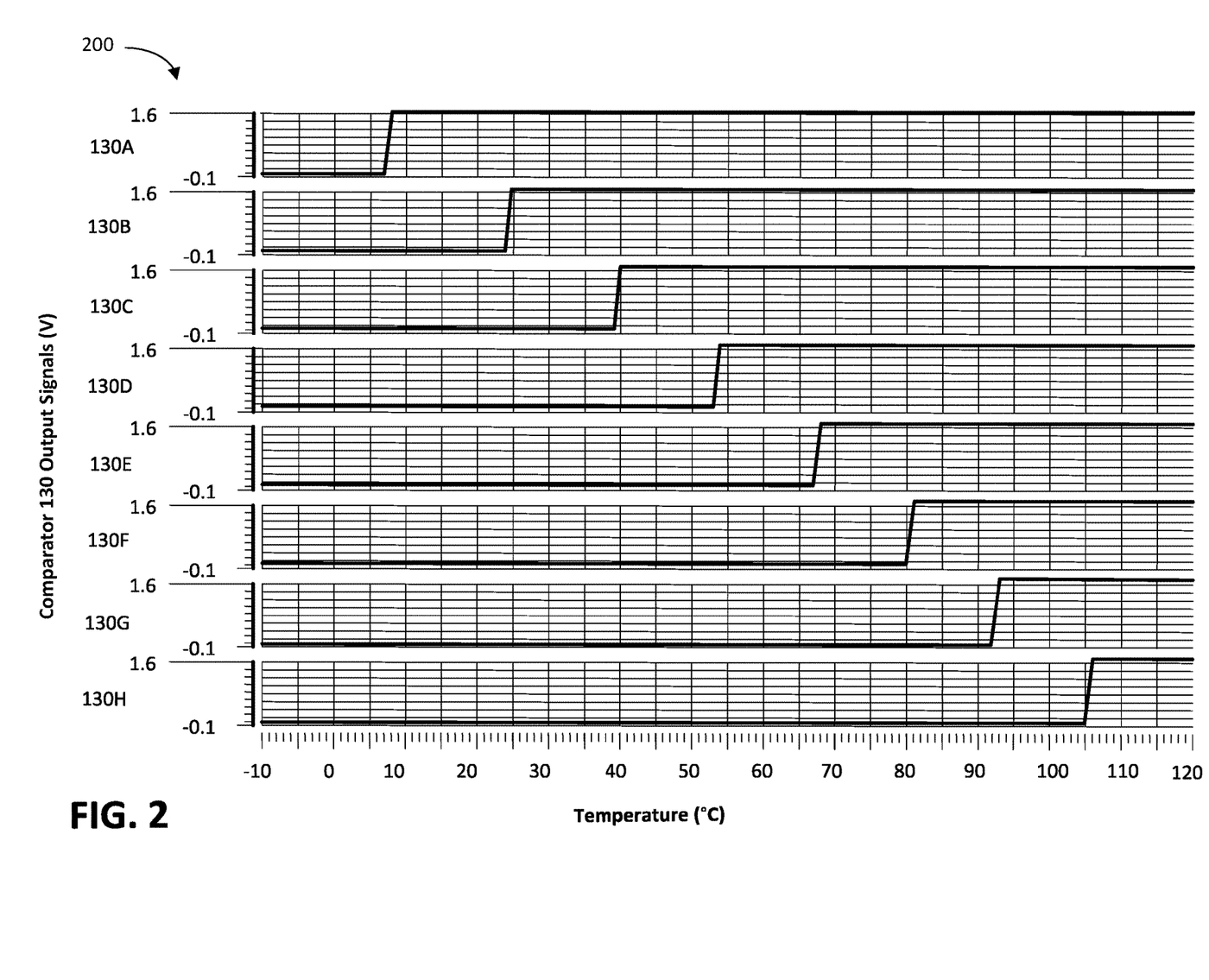
FIG. 2 is a diagram illustrating a graph of comparator outputs representing different temperature zones, according to some embodiments of the present disclosure.

FIG. 2 illustrates the output of each comparator 130 as the temperature of the memory core increases. Because tap point T1 is first tap point in the resistor ladder 125, the voltage at tap point T1 is the highest among all tap points T1-T8. Thus, the corresponding input voltage to comparator 130A is the highest among all comparators 130A-130H. As can be seen, when the temperature of the memory core reaches 9 degrees, the VT1 may fall below the Vref and the comparator 130A may change its output from one binary state to another, such as from "0" to "1." Similarly, when the temperature of the memory core reaches 25 degrees, the VT2 may fall below the Vref and the comparator 130B may change its output from "0" to "1." As the temperature of the memory core continues to increase, the number of comparators 130A-130H having "1" as an output may increase. In this way, the outputs of the plurality of comparators 130A-130H may define a plurality of temperature zones. For example, if the output of comparators 130A and 130B is "1" (while the output of the remaining comparators 130 is "0"), this may correspond to a temperature zone of 25 degrees to 39 degrees, whereas if the output of comparators 130A, 130B, 130C, and 130D is "1," this may correspond to a temperature zone of 54 degrees to 77 degrees. It should be noted that the resolution of the temperature zones may be increased by increasing the number of tap points T in the resistor ladder 125 and the number of comparators 130A-130H.

As discussed in further detail herein, the sensor 100 may be integrated with a 1T1C reference voltage generator (e.g., F-RAM 1T1C reference voltage generator 715) as part of a memory device (e.g., memory device 700 as shown in FIG. 7) such that the outputs of comparators 130A-130H may be used as a trim to adjust the 1T1C Vref (i.e., the reference voltage generated by the 1T1C reference voltage generator) to compensate for effects due to changes in temperature of the memory core, based on the indicated temperature zone. As discussed above, the outputs of the sensor 100 (i.e., the outputs of the plurality of comparators 130) may define a plurality of temperature zones. In one embodiment, the 1T1C reference voltage generator may adjust the 1T1C reference voltage based on the output signals received from the plurality of comparators 130A-130H. For example, while the output of comparators 130A and 130B is "1" (while the output of the remaining comparators 130 is "0"), this may correspond to a temperature zone of 25 degrees to 39 degrees, and the 1T1C reference voltage generator may adjust the 1T1C reference voltage accordingly. If the output of comparators 130A, 130B, 130C, and 130D is "1" (while the output of the remaining comparators 130 is "0"), this may correspond to a temperature zone of 54 degrees to 77 degrees. It should be noted that the temperature zones discussed herein are for example purposes only, and the temperature zones may be defined in any appropriate desired resolution.

With respect to adjusting the 1T1C Vref, the 1T1C reference voltage generator may accomplish this using any appropriate means. In one example, the 1T1C reference voltage generator may comprise a set of capacitor units that control the 1T1C Vref. The output of the sensor 100 may control the removal or addition of capacitor units from the 1T1C reference voltage generator so that it increases or decreases the 1T1C Vref as necessary. In other embodiments, outputs of sensor 100 may be used to trim or adjust other single-ended sensing reference signal strength of other types of memory technology for temperature compensation, such as Flash memory, R-RAM, M-RAM, Floating gate memory, etc.

FIG. 3 illustrates a graph 300 of the P-term (shown as curve 315 with squares) and U-term (shown as curve 320 with circles) (in mV) versus temperature for an F-RAM memory core. Graph 300 also illustrates a temperature independent (i.e., constant) 1T1C Vref 305 generated with or without embodiments of the present disclosure and a temperature dependent 1T1C Vref 310 generated in accordance with embodiments of the present disclosure. As can be seen, the P-term 315 of F-RAM cells in the memory core gradually reduces as the temperature of the memory core increases. Thus, using the temperature independent 1T1C Vref 305, the sensing margin between the P-term 315 and the 1T1C Vref 305 also gradually reduces as the temperature of the memory core increases. As a result, as the temperature of the memory core increases, the ability to distinguish a data "1" will be reduced. However, the 1T1C Vref 310 is temperature dependent, and is controlled by the output of the sensor 100 (or the sensor 400 in some embodiments as described in further detail herein) and steps down as the temperature of the memory core rises. In this way, the margin between the P-term 315 and the 1T1C Vref 310 is maintained. In the example of FIG. 3, when using the 1T1C Vref 310, the P-term margin at 125 degrees C. could be twice that of the P-term margin when using the 1T1C Vref 305 at the same temperature.

Figure 4:
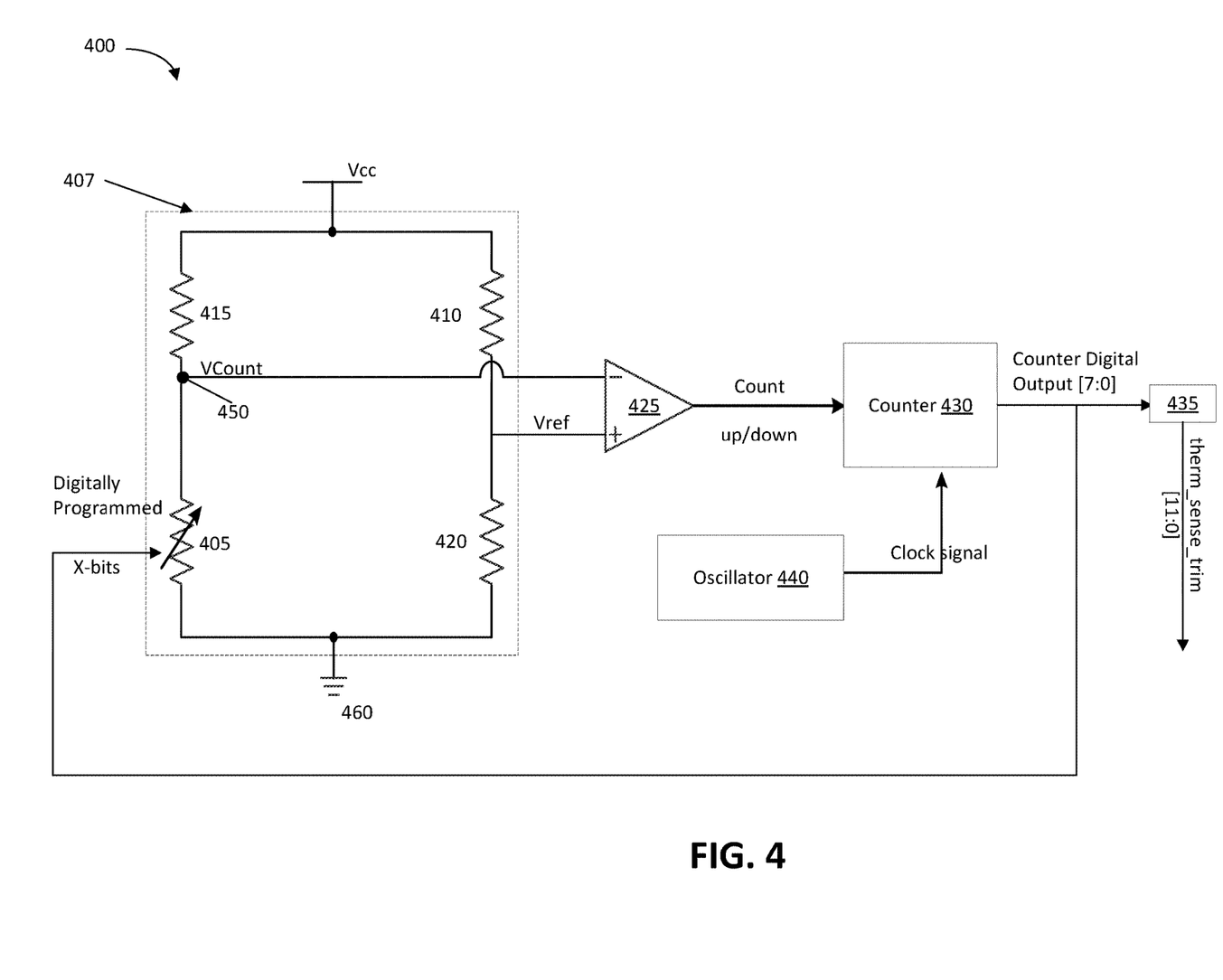
FIG. 4 is a diagram illustrating a temperature sensor, according to some embodiments of the present disclosure.

Although the sensor 100 may be utilized to realize a varying and temperature dependent 1T1C Vref, the process of trimming the resistance ladder 125 to achieve an outputs with desired temperature intervals may be difficult, especially in scenarios where each comparator 130 has a different voltage offset and/or where a desired resolution is higher (e.g., more comparators 130 are required). FIG. 4 illustrates a temperature sensor 400 (hereinafter referred to as "sensor 400") for sensing the temperature of a memory core (e.g., F-RAM memory core 705 shown in FIG. 7) that overcomes the above issues with sensor 100 of FIG. 1. When integrated with a 1T1C reference voltage generator (e.g., F-RAM 1T1C reference voltage generator 715) as part of a memory device (e.g., memory device 700 as shown in FIG. 7), the output of the sensor 400 may be used by the 1T1C reference voltage generator to provide a temperature variant 1T1C Vref, in accordance with some embodiments of the present disclosure.

Sensor 400 may comprise resistors 405 and 410, and resistors 415 and 420. The resistors 405-420 may form a resistor circuit 407 (e.g., a resistor ladder). Resistors 405 and 410 may be Nwell resistors or other resistive devices that have a large positive temperature coefficient (i.e., the resistance value of resistors 405 and 410 may change significantly as temperature changes). By contrast, resistors 415 and 420 may be silicide-blocked polysilicon resistors or other resistive devices that have a small temperature coefficient that is close to zero relative to the temperature coefficient of the resistors 405 and 410. Stated differently, the resistance value of resistors 415 and 420 may not change significantly as the temperature of the memory core changes. Resistors 405-420 may be coupled together in a manner similar to that for resistors 105-120 as shown in FIG. 1, such that as the temperature of the memory core increases, the resistance of resistor 405 may also increase, thereby resulting in an increase in the voltage at node 450 (VCount). Node 450 may represent the division point between resistor 405 and resistor 415. At the same time, the increase in temperature of the memory core may cause the resistance of resistor 410 to increase while the resistance of resistor 420 remains unchanged, thereby resulting in a decrease in the reference voltage of the sensor 400 (Vref). the voltage at the bottom of resistor 415 may increase as the temperature increases, causing the resistance of resistor 405 to increase. The voltage at the top of resistor 420 may decrease as the temperature of the memory core increases, causing the resistance of resistor 410 to increase. However, resistor 405 may be a variable resistor that is trimmed or configurable in order to make the input voltages to the comparator 425 (i.e., Vref and VCount as shown in FIG. 4) equal, indicating a state in which the current temperature of the memory core may be determined, as discussed in further detail herein. It should be noted that the Vref refers to a reference voltage of the sensor 400, and is to be distinguished from the 1T1C Vref generated by e.g., F-RAM 1T1C reference voltage generator 715 as shown in FIG. 7.

As discussed above, as the temperature of the memory core increases, the Vref may gradually reduce while the VCount gradually increases. Thus, in order for the Vref and the VCount to be equal, the resistance of resistor 405 must be reduced as the temperature of the memory core increases. Thus, sensor 400 may further include comparator 425 which may receive as input, the output voltages of the resistor circuit 407 (Vref and VCount). Sensor 400 may further include an up/down counter logic block 430 (hereinafter referred to as counter 430), which may be coupled with comparator 425 to form a feedback loop to allow for control of the resistor 405 as discussed in further detail herein. The counter 430 may maintain a count value based on the output of the comparator 425, and may output a current value of the count value. More specifically, as the temperature of the memory core increases, Vref may gradually reduce while the VCount gradually increases and thus the output of comparator 425 may be "1" ("high") as VCount is currently above Vref. In response to receiving an input of 1 from the comparator 425, the counter 430 may count up (increment the current count value). If VCount is below Vref, the output of comparator 425 may be "0" ("low"), and the counter 430 may count down (decrement the current count value) based on receiving an input of 0. The counter 430 may operate based on a clock signal provided by an oscillator 440. The count value of the counter 430 may range from e.g., 100-200, and as the count value increases, this may correspond to an increase in the temperature of the memory core. In some embodiments, the count value may have a minimum value of 0, and may have a maximum value of $2^X-1$ (for an X-bit up/down counter).

The counter 430 may output the current value (shown as "counter digital output [7:0]" in FIGS. 4 and 5) of the count value as a digital input word of "x" bits (8 in the example of FIG. 4) that is used to control (trim) the resistance value of resistor 405 to gradually equalize VCount and Vref. As the current value gradually increases, the resistance value of resistor 405 may gradually decrease. For example, for every increase of 10 in the current value, the counter 430 may change one or more bits of the "x" bit input word to reflect the current temperature (e.g., a change in the current value from 6 to 16 may correspond to a change in the digital output word from 00110 to 010000). Thus, at 50 degrees, the input word may be 00000, and as the temperature of the memory core increases, one or more bits in the input word may change (e.g., from low to high ("0" to "1") or high to low), which may correspond to an increase in the temperature. Continuing the above example, a change in temperature from 50 degrees to 60 degrees may result in an input word of 00001. Thus, as the temperature of the memory core increases (causing the VCount to increase and the Vref to decrease), the current value may increase resulting in counter digital outputs that gradually lower the resistance value of resistor 405. Similarly, if the temperature of the memory core drops, the Vcount will fall below the Vref, and the output of comparator 425 is 0. This may cause the counter 430 to decrement the count value and generate counter digital outputs that will increase the resistance of resistor 405 until VCount and Vref are equal. This action of the comparator 425 and the counter 430 continually adjusts the value of resistor 405 until Vref and VCount equalize (the input voltages of the comparator 425 equalize), which may cause the output of the comparator 425 to alternately shift between "1" and "0." This in turn may cause the counter 430 to toggle (stabilize) between 2 count values. For example, upon Vref and VCount equalizing, the current value of the count value may shift between 99 and 100 alternatively. When this condition is achieved, the output of counter 430 (either 99 or 100 in the example above) may indicate the current temperature of the memory core.

The counter 430 may be coupled to a count translator logic block 435 (hereinafter count translator 435) which may receive as input, the counter digital output from the counter 430 and convert the counter digital output into an "x" bit trim (shown as therm_sense_trim [11:0] in FIGS. 4 and 5) for the 1T1C reference voltage generator to use in generating the 1T1C Vref. More specifically, the count translator 435 may normalize the digital counter output value across process corners and convert the normalized counter output value into trims for the 1T1C reference voltage generator. These trims may be provided to the 1T1C reference voltage generator over time (e.g., as the temperature of the memory core increases), which may utilize the trims to provide a temperature dependent 1T1C Vref which is based on the temperature profile of the memory core.

The embodiments described in FIG. 4 provide a temperature sensor that is easier to calibrate because it includes a single comparator so that there are no input offset differences to be accounted for. Although the oscillator 440 is required to provide a clock signal to the counter 430, the temperature sensor 400 may provide a higher resolution (e.g., more output bits) compared to the sensor 100, which is also advantageous. In addition, the detection temperature can be configured by changing the number of count values between adjacent temperature detections. For example, therm_sense_trim [0] may be 1 when the count value is 100 (at 25C), and therm_sense_trim [1] may be 1 when the count value is 110 (at 35C). This can be changed so that therm_sense_trim [0] may be 1 when the count value is 100 (at 25C), and therm_sense_trim [1] may be 1 when the count value is 114 (at 40C).

Figure 5:
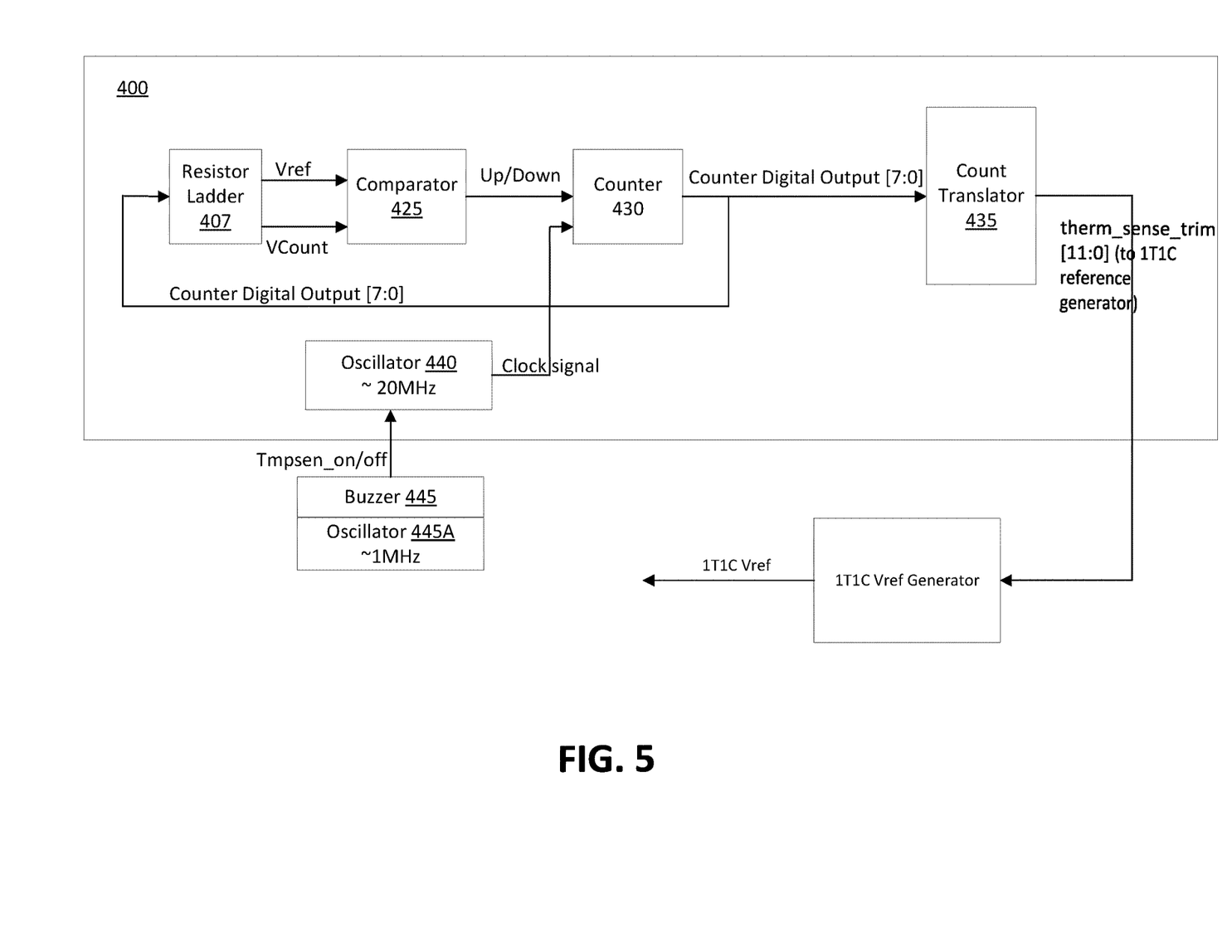
FIG. 5 is a block diagram illustrating of the temperature sensor of FIG. 4, according to some embodiments of the present disclosure.

FIG. 5 illustrates a block diagram of the sensor 400 in accordance with some embodiments of the present disclosure. As shown, the sensor 400 may be coupled to a buzzer circuit 445 (hereinafter referred to as "buzzer 445") which may turn the sensor 400 on and off to manage current consumption. This is possible because the temperature of the memory core does not change instantly, but rather changes in intervals (e.g., 10 degrees/second). Thus, the buzzer 445 may generate on/off pulses (illustrated in FIG. 5 as "Tmpsen_on/off") which allow the sensor 400 to wake up for a time period, sense the temperature of the memory core (not shown in FIG. 5), and return to sleep immediately. In this way, the buzzer 445 may optimize the power consumption of the sensor 400. The buzzer 445 may utilize its own ring oscillator 445A which may operate at e.g., 1-2 MHz frequency.

Figure 6A:
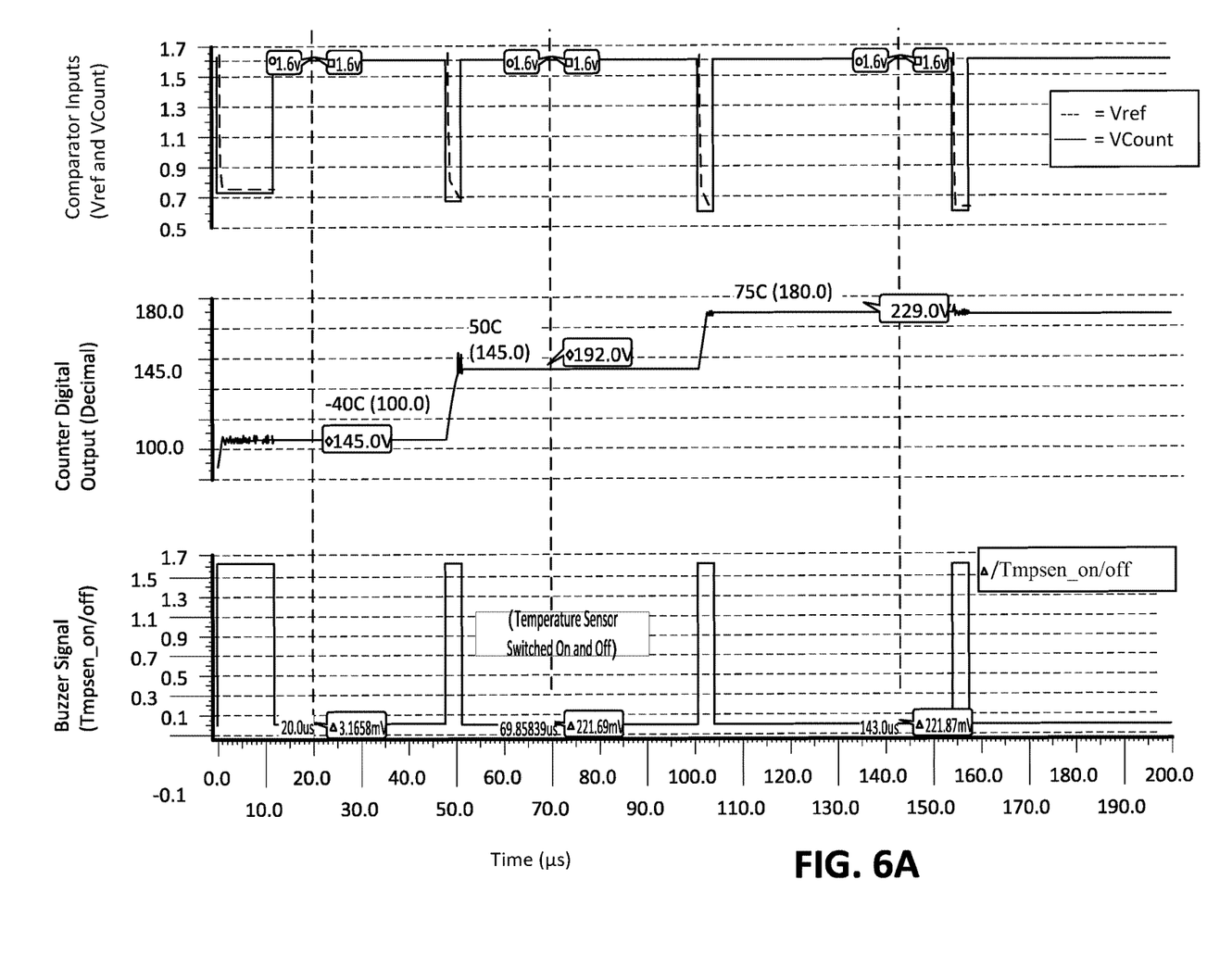
FIG. 6A is a diagram illustrating the performance of the temperature sensor of FIG. 5, according to some embodiments of the present disclosure.

FIG. 6A is a graph 600 of the performance of the temperature sensor 400 over time and specifically, the inputs to comparator 425 (Vref and VCount), the counter digital output, and the on/off pulses of the buzzer 445 (Tmpsen_on/off), versus time. For the purposes of graph 600, the decimal value of the counter digital output is converted to a voltage in order to view it as a waveform. As can be seen, the buzzer 445 may provide an "on" signal to the sensor 400 during the first 10 microseconds (μs) during which time the sensor 400 may determine the temperature of the memory core to be −40 degrees C. (also shown as 145.0V), represented by the counter digital output (in decimal) as 100.0. FIG. 6A also illustrates how the inputs to the comparator 425 (Vref and VCount) are divergent at the beginning of the 10 μs measurement cycle, but are matching near the end as the action of the comparator 425 and the counter 430 continually adjusts the value of resistor 405 until Vref and VCount equalize, as discussed in further detail herein. At 10 μs the buzzer 445 may send an "off" signal to the sensor 400. Later, at 47 μs, the buzzer 445 may once again send an "on" signal to the sensor 400 before sending an "off" signal to the sensor 400 once again at 52 μs. During this second measurement cycle, the sensor 400 may determine the temperature of the memory core to be 50 degrees C. (also shown as 192.0V), represented by the counter digital output (in decimal) as 145.0. Once again, the Vref and VCount values may be different until later in the measurement cycle, when the action of the comparator 425 and the counter 430 equalizes the Vref and VCount.

Figure 6B:
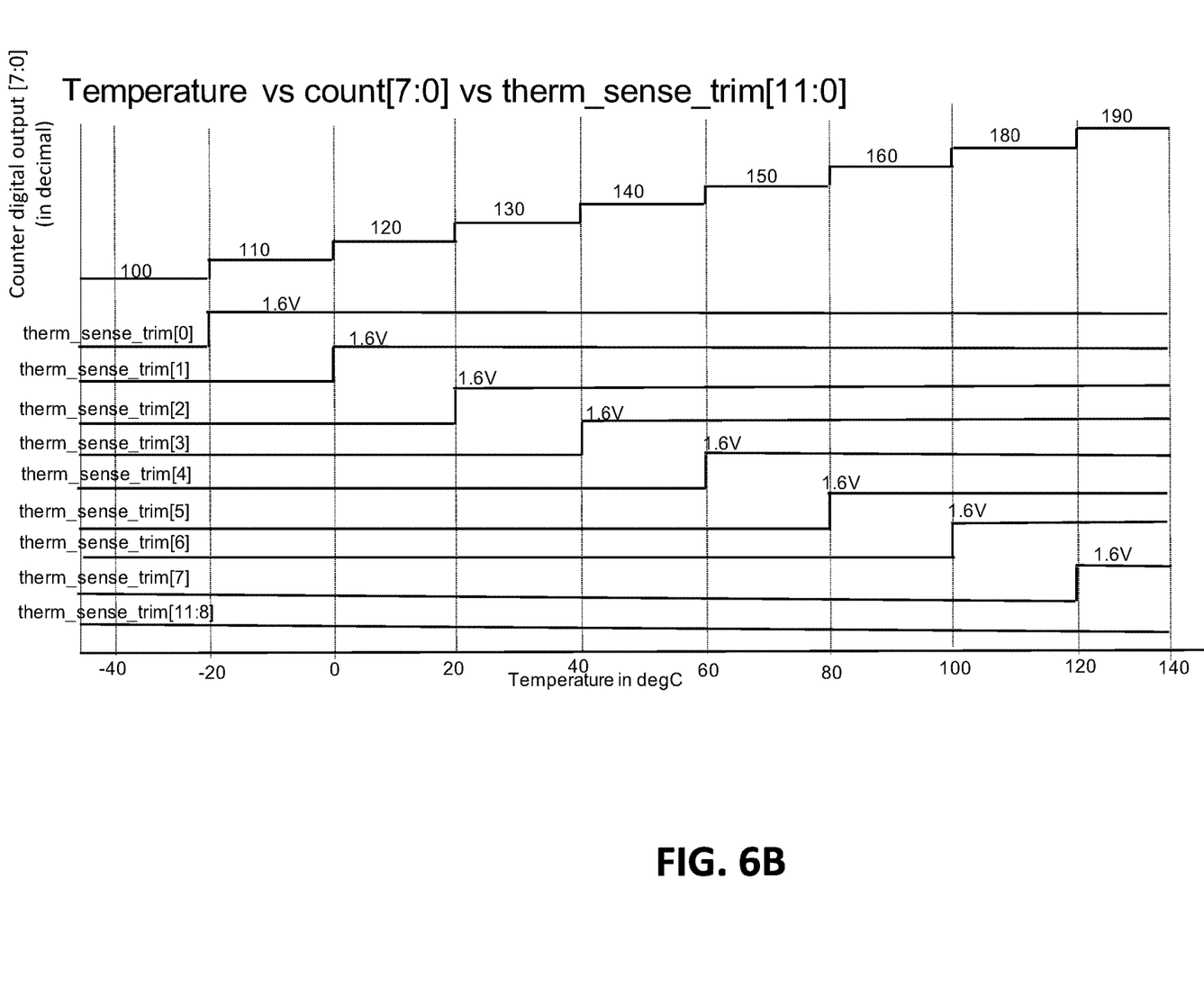
FIG. 6B is a graph illustrating the relationship between temperature, the counter digital output, and VCount of the sensor of FIG. 5, according to some embodiments of the present disclosure.

FIG. 6B is a graph illustrating the counter digital output [7:0] (in decimal) from the counter 430 and the therm_sense_trim [11:0] generated therefrom by the count translator 435 as temperature of the memory core increases. FIG. 6B illustrates the relationship between the counter digital output [7:0] and the therm_sense_trim [11:0] as the count translator 435 normalizes the counter digital counter output value across process corners and converts the normalized counter digital output value into trims for the 1T1C reference voltage generator.

FIG. 7A illustrates a memory device 700 in which embodiments of the present disclosure may be realized. Memory device 700 comprises F-RAM memory core 705, sensor 400, timing control 710, and the 1T1C reference voltage generator 715. Although illustrated with the sensor 400, the sensor 100 illustrated in FIG. 1 may also be used here. As can be seen, the output of sensor 400 (or sensor 100) is provided to the 1T1C reference voltage generator 715, which adjusts the 1T1C reference it provides to the F-RAM memory core based on the output of sensor 400. As discussed herein, the output of the sensor 400 may comprise an appropriate trim for the 1T1C reference voltage generator to use to generate a temperature dependent 1T1C Vref (as best shown as 1T1C Vref 310 in FIG. 3) that is supplied to the F-RAM core 705 for single ended sensing/reading operations. This 1T1C Vref will enable the memory device 700 to distinguish between the P-term and U-term across a range of temperatures as discussed herein. As shown in FIG. 3 the 1T1C Vref generated using embodiments of the present disclosure is temperature dependent and has a temperature profile for that allows for differentiation between the P-term or U-term over a temperature range. Because the memory device 700 can modulate the 1T1C Vref, it can ensure that the margin of error between the P-term and the U-term stays constant throughout the temperature range. The timing control circuit 710 may provide timing and coordination among the various components of memory device 700. Although illustrated as an F-RAM memory core 705, the memory core may be a memory device based on any appropriate memory technology such as floating gate, Flash, R-RAM, M-RAM, etc. The 1T1C reference voltage generator 715 may be a device providing temperature dependent sensing reference signals for said memory device, trimming or adjusting the sensing reference signal strengths responding at least partially to the outputs of temperature sensor 400 or 100.

Figure 7B:
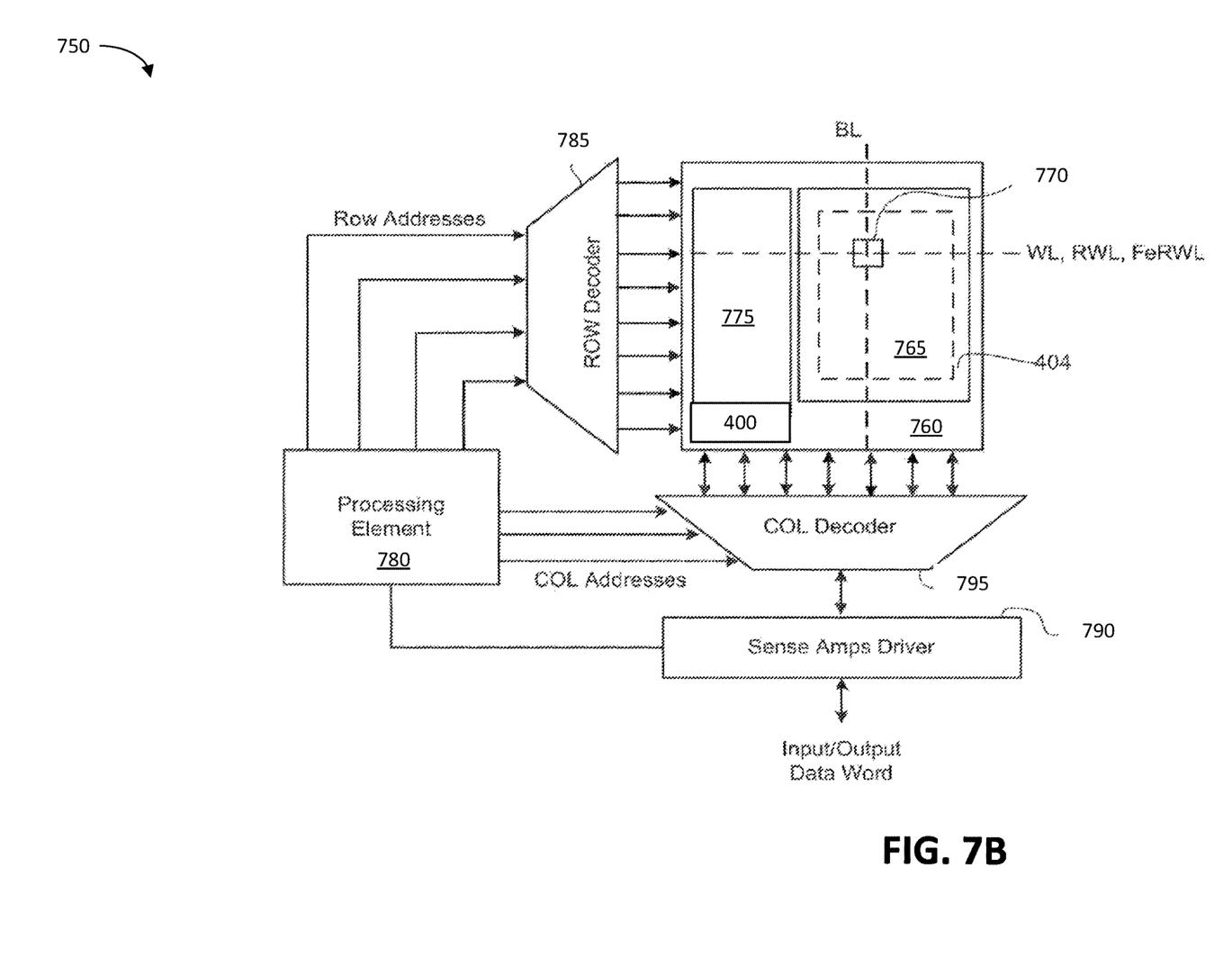
FIG. 7B illustrates a memory device in which embodiments of the present disclosure may be realized.

FIG. 7B illustrates a block diagram of a semiconductor memory 750 including memory portion 760. Within memory portion 760, there is memory array 765 of non-volatile (NV) memory cells 770 arranged in a number of rows each sharing a common word-line (WL) and a number of columns each sharing a common bit-line. In one embodiment, NV memory cells 770 may be 1T1C F-RAM cells, for example. In one embodiment, the 1T1C reference voltage generator 775 and the sensor 400 (or the sensor 100 in some embodiments) may also be disposed within memory portion 760.

Semiconductor memory 750 further includes processing element 780, such as a micro controller, micro-processor or state machine. In one embodiment, processing element 780 may issue commands or control signals, such as WL, RWL signals to each of the NV memory cells 770 and reference generating array 775 to execute read, erase and program operations as described above, and other peripheral circuits for reading from or writing to the memory array 765. The peripheral circuits include row decoder 785 to convert and apply a memory address to the word-lines of NV memory cells 770 of the memory array 765. When a data word is read from the semiconductor memory 750, NV memory cells 770 coupled to a selected word-line (WL) are read out to bit-line, and a state of those lines is detected by sense amplifier/driver 790. The column decoder 795 outputs the data from the bit-line onto sense amplifier/driver 790. In one embodiment, row and/or column decoder 785 and 795 may also convert and apply an address to the read word-lines (RWL) to control the output of particular hybrid temperature dependent 1T1C reference signal to sense amplifier/driver 790 for a read operation.

Figure 8:
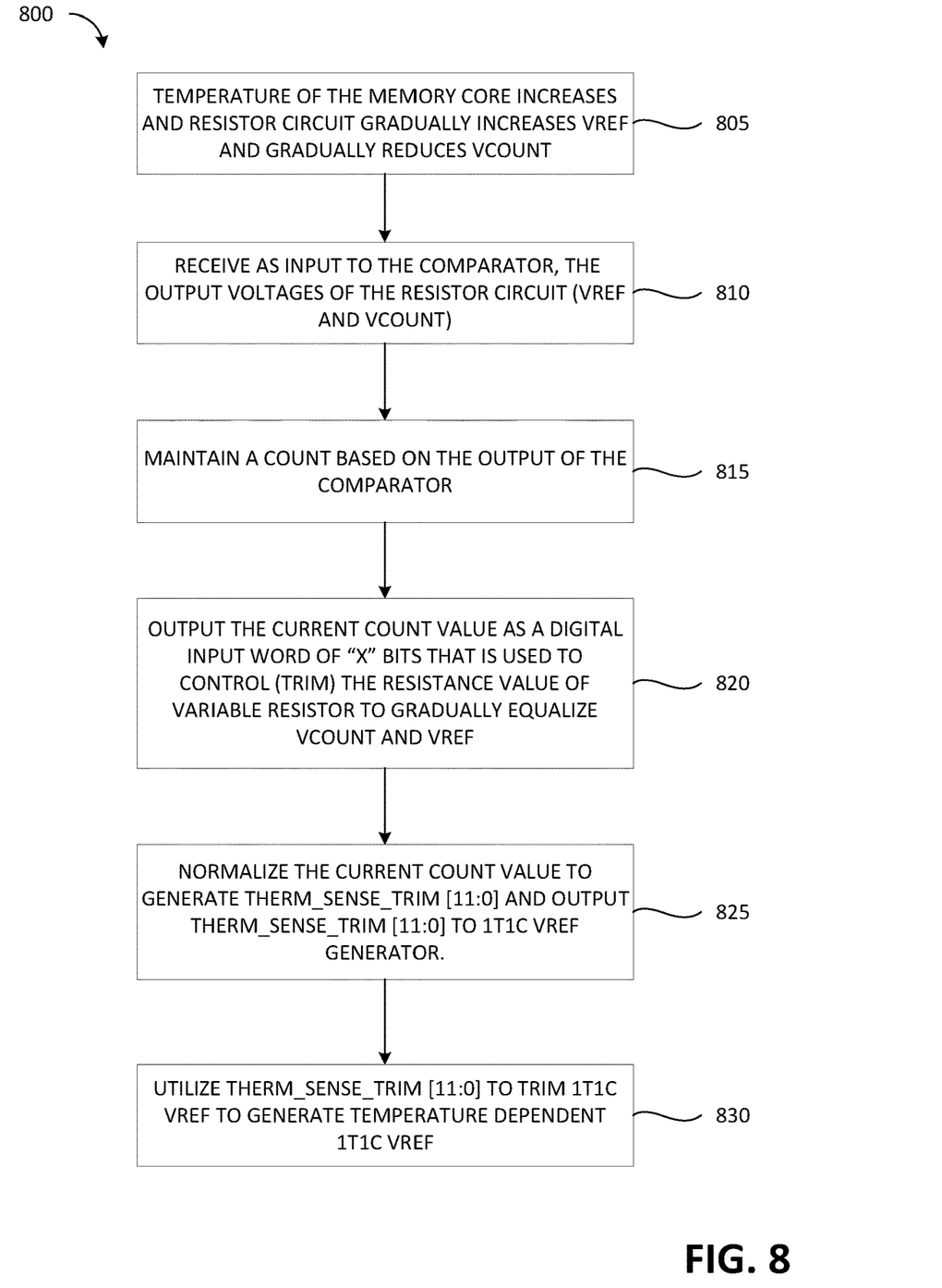
FIG. 8 is a flow diagram of a method for providing a temperature dependent 1T1C reference voltage, in accordance with some embodiments of the present disclosure.

FIG. 8 is a flow diagram of a method 800 for providing a temperature dependent 1T1C reference voltage, in accordance with some embodiments of the present disclosure. Method 800 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. For example, the method 800 may be performed by the sensor 400 of FIGS. 4 and 5.

Referring also to FIGS. 4 and 5, at block 805, as the temperature of the memory core increases, the Vref may gradually reduce while the VCount gradually increases. Thus, in order for the Vref and the VCount to be equal, the resistance of resistor 405 must be reduced as the temperature of the memory core increases. Thus, sensor 400 may further include comparator 425 which at block 810, may receive as input, the output voltages of the resistor circuit 407 (Vref and VCount). Sensor 400 may further include an up/down counter logic block 430 (hereinafter referred to as counter 430), which may be coupled with comparator 425 to form a feedback loop to allow for control of the resistor 405 as discussed in further detail herein. The counter 430 may, at block 815, maintain a count value based on the output of the comparator 425 (which in turn depends on the temperature of the memory core), and may output a current value of the count value. More specifically, as the temperature of the memory core increases, Vref may gradually reduce while the VCount gradually increases and thus the output of comparator 425 may be "1" ("high") as VCount is currently above Vref. In response to receiving an input of 1 from the comparator 425, the counter 430 may count up (increment the current count value). If VCount is below Vref, the output of comparator 425 may be "0" ("low"), and the counter 430 may count down (decrement the current count value) based on receiving an input of 0. The counter 430 may operate based on a clock signal provided by an oscillator 440. The count value of the counter 430 may range from e.g., 50-150, and as the count value increases, this may correspond to an increase in the temperature of the memory core. In some embodiments, the count value may have a minimum value of 0, and may have a maximum value of $2^x-1$ (for an X-bit up/down counter).

At block 820, the counter 430 may output the current value (shown as "counter digital output [7:0]" in FIGS. 4 and 5) of the count value as a digital input word of "x" bits (8 in the example of FIG. 4) that is used to control (trim) the resistance value of resistor 405 to gradually equalize VCount and Vref. As the current value gradually increases, the resistance value of resistor 405 may gradually decrease. For example, for every increase of 10 in the current value, the counter 430 may change one or more bits of the "x" bit input word to reflect the current temperature (e.g., a change in the current value from 6 to 16 may correspond to a change in the digital output word from 00110 to 010000). Thus, at 50 degrees, the input word may be 00000, and as the temperature of the memory core increases, one or more bits in the input word may change (e.g., from low to high ("0" to "1") or high to low), which may correspond to an increase in the temperature. Continuing the above example, a change in temperature from 50 degrees to 60 degrees may result in an input word of 00001. Thus, as the temperature of the memory core increases (causing the VCount to increase and the Vref to decrease), the current value may increase resulting in counter digital outputs that gradually lower the resistance value of resistor 405. Similarly, if the temperature of the memory core drops, the Vcount will fall below the Vref, and the output of comparator 425 is 0. This may cause the counter 430 to decrement the count value and generate counter digital outputs that will increase the resistance of resistor 405 until VCount and Vref are equal. This action of the comparator 425 and the counter 430 continually adjusts the value of resistor 405 until Vref and VCount equalize (the input voltages of the comparator 425 equalize), which may cause the output of the comparator 425 to alternately shift between "1" and "0." This in turn may cause the counter 430 to toggle (stabilize) between 2 count values. For example, upon Vref and VCount equalizing, the current value of the count value may shift between 99 and 100 alternatively. When this condition is achieved, the output of counter 430 (either 99 or 100 in the example above) may indicate the current temperature of the memory core.

The counter 430 may be coupled to a count translator logic block 435 (hereinafter count translator 435) which may receive as input, the counter digital output from the counter 430 and convert the counter digital output into an "x" bit trim (shown as therm_sense_trim [11:0] in FIGS. 4 and 5) for the 1T1C reference voltage generator to use in generating the 1T1C Vref. More specifically, at block 825, the count translator 435 may normalize the digital counter output value across process corners and convert the normalized counter output value into trims for the 1T1C reference voltage generator. These trims may be provided to the 1T1C reference voltage generator over time (e.g., as the temperature of the memory core increases), which at block 830 may utilize the trims to provide a temperature dependent 1T1C Vref which is based on the temperature profile of the memory core.

The embodiments described herein may be used in various designs of mutual-capacitance sensing systems, in self-capacitance sensing systems, or combinations of both. The embodiments described herein are not tied to a particular capacitive sensing solution and can be used as well with other sensing solutions, including optical sensing solutions, as would be appreciated by one of ordinary skill in the art having the benefit of this disclosure.

In the above description, numerous details are set forth. It will be apparent, however, to one of ordinary skill in the art having the benefit of this disclosure, that embodiments of the present disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining," "detecting," "comparing," "resetting," "adding," "calculating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

Embodiments descried herein may also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions. The term "computer-readable storage medium" should be taken to include a single medium or multiple media (e.g., a centralized or distributed database and/or associated caches and servers) that store one or more sets of instructions. The term "computer-readable medium" shall also be taken to include any medium that is capable of storing, encoding, or carrying a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, any medium that is capable of storing a set of instructions for execution by the machine and that causes the machine to perform any one or more of the methodologies of the present embodiments.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the embodiments as described herein.

The above description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present embodiments. Thus, the specific details set forth above are merely exemplary. Particular implementations may vary from these exemplary details and still be contemplated to be within the scope of the present embodiments.

It is to be understood that the above description is intended to be illustrative and not restrictive. Many other embodiments will be apparent to those of skill in the art upon reading and understanding the above description. The scope of the embodiments should, therefore, be determined with reference to the appended claims, along with the full scope of equivalents to which such claims are entitled.

What is claimed is:

1. An apparatus comprising:
   a resistor circuit comprising a set of resistors configured to control a reference voltage based on a temperature of a memory, each resistor of the set of resistors having a first or second temperature coefficient, and wherein a first resistor of the set of resistors modifies its resistance value based on the temperature of the memory until the reference voltage and an output voltage are equal;
   a comparator configured to output count-up signals and count-down signals; and
   a counter configured to:
      increment and decrement a current count value based on the count-up signals and the count-down signals output by the comparator; and
      periodically output a word corresponding to the current count value, the word indicating the temperature of the memory to the first resistor,
   wherein the resistor circuit comprises a resistor ladder including a number of second resistors in series with the first resistor, and wherein the first resistor comprises a positive first temperature coefficient, and the number of second resistors include one or more resistors, each having a second temperature coefficient that less than the first temperature coefficient.

2. The apparatus of claim 1, wherein to output count up and count down signals, the comparator is configured to:
   compare the reference voltage with the output voltage; and
   output a count up signal to the counter if the output voltage is lower than the reference voltage and output a count-down signal to the counter if the output voltage is higher than the reference voltage.

3. The apparatus of claim 2, wherein a toggling of the current count value between two different values indicates that the reference voltage and the output voltage are equal, and wherein a word output subsequent to the toggling of the current count value indicates a current temperature of the memory.

4. The apparatus of claim 3, further comprising:
   a count translator configured to:
      translate the word output subsequent to the toggling of the current count value into a trim value; and
      output the trim value to a reference signal generator of a memory device, the memory device including the memory.

5. The apparatus of claim 4, wherein the reference signal generator is a one transistor one capacitor (1T1C) reference signal generator.

6. The apparatus of claim 1, wherein the memory is a ferroelectric random access memory (F-RAM).

7. The apparatus of claim 1,
   wherein the first resistor comprises an Nwell resistor, and the number of second resistors comprise silicide-blocked polysilicon resistors; and
   wherein the second temperature coefficient does not result in a change in resistance of the number of second resistors based on the temperature of the memory relative to the first temperature coefficient.

8. A system comprising:
   a memory;
   a reference signal generator configured to generate a reference signal based on a current temperature of the memory; and
   a temperature sensor comprising:
      a resistor circuit comprising a set of resistors configured to control a reference voltage based on a temperature of the memory, each resistor of the set of resistors having a first or second temperature coefficient, and wherein a first resistor of the set of resistors modifies its resistance value based on the temperature of the memory until the reference voltage and an output voltage are equal;
      a comparator configured to output count-up signals and count-down signals; and a counter configured to:
         increment and decrement a current count value based on the count-up signals and the count-down signals output by the comparator; and
         periodically output a word corresponding to the current count value, the word indicating the temperature of the memory to the first resistor,
   wherein one or more resistors of the set of resistors having the first temperature coefficient comprises an Nwell resistor, and one or more resistors of the set of resistors having the second temperature coefficient comprises a silicide-blocked polysilicon resistor.

9. The system of claim 8, wherein to output count up and count down signals, the comparator is configured to:
   compare the reference voltage with the output voltage; and
   output a count up signal to the counter if the output voltage is lower than the reference voltage and output a count-down signal to the counter if the output voltage is higher than the reference voltage.

10. The system of claim 9, wherein a toggling of the current count value between two different values indicates that the reference voltage and the output voltage are equal, and wherein a word output subsequent to the toggling of the current count value indicates a current temperature of the memory.

11. The system of claim 10, wherein the temperature sensor further comprises:
    a count translator configured to:
       translate the word output subsequent to the toggling of the current count value into a trim value; and
       output the trim value to the reference signal generator.

12. The system of claim 11, wherein the reference signal is a one transistor one capacitor (1T1C) reference signal.

13. The system of claim 8, further comprising:
a buzzer circuit configured to operate the temperature sensor at periodic intervals and to maintain the temperature sensor in a low power state outside of the periodic intervals.

14. An apparatus comprising:
a resistor circuit comprising a set of resistors configured to control a reference voltage based on a temperature of a memory, each resistor of the set of resistors having a first or second temperature coefficient;
a resistor stack coupled to the resistor circuit, the resistor stack comprising a plurality of tap points, and wherein an output voltage at each of the plurality of tap points is successively lower than an output voltage at a previous tap point; and
a plurality of comparators, each comparator of the plurality of comparators coupled to a corresponding tap point from the plurality of tap points, and wherein each of the plurality of comparators is configured to:
compare an output voltage at the corresponding tap point to the reference voltage; and
output a high signal when the output voltage of the corresponding tap point is greater than the reference voltage,
wherein one or more resistors of the set of resistors having the first temperature coefficient comprises an Nwell resistor, and one or more resistors of the set of resistors having the second temperature coefficient comprises a silicide-blocked polysilicon resistor.

15. The apparatus of claim 14, wherein the reference voltage decreases as the temperature increases based on a ratio of resistance values among the set of resistors such that each successive comparator of the plurality of comparators outputs a respective high signal as the temperature of the memory rises.

16. The apparatus of claim 15, wherein each of the plurality of comparators outputs the respective high signal to a reference signal generator of a memory device, the memory device including the memory.

17. The apparatus of claim 15, wherein each successive high signal defines a temperature zone such that a plurality of temperature zones is defined.

18. The apparatus of claim 14, wherein the set of resistors comprises:
one or more resistors having the first temperature coefficient, the first temperature coefficient being positive; and
one or more resistors having the second temperature coefficient, wherein the second temperature coefficient does not result in a change in resistance based on the temperature of the memory relative to the first temperature coefficient.

19. The apparatus of claim 14, wherein the memory is a ferroelectric random access memory (F-RAM).

20. The apparatus of claim 16, wherein the reference signal generator is a one transistor one capacitor (1T1C) reference signal generator.

* * * * *